United States Patent [19]

Thewlis et al.

[11] Patent Number: 4,786,087
[45] Date of Patent: Nov. 22, 1988

[54] QUICK DISCONNECT COUPLING

[75] Inventors: Duane E. Thewlis, Norton; Eugene W. Brown, North Canton, both of Ohio

[73] Assignee: The B. F. Goodrich Company, Akron, Ohio

[21] Appl. No.: 126,050

[22] Filed: Nov. 27, 1987

[51] Int. Cl.[4] .............................................. F16L 33/16
[52] U.S. Cl. ...................................... 285/97; 285/286
[58] Field of Search ................................... 285/97, 286

[56] References Cited

U.S. PATENT DOCUMENTS

| | | | |
|---|---|---|---|
| 3,190,679 | 6/1965 | Lester | 285/97 X |
| 3,695,637 | 10/1972 | Satterthwaite et al. | 285/97 |
| 4,373,377 | 2/1983 | Smith et al. | 285/97 X |
| 4,630,648 | 12/1986 | McCord | 285/97 X |

FOREIGN PATENT DOCUMENTS 459687  9/1968  Switzerland ......................... 285/97

Primary Examiner—Dave W. Arola
Attorney, Agent, or Firm—Joseph Januszkiewicz

[57] ABSTRACT

A quick disconnect coupling that is used to interconnect a dispensing hose from a reactor tank to any one of a plurality of charge tanks to facilitate the transfer of ingredients from the charge tanks to the reactor tank. Each charge tank has an outlet pipe with an annular flange thereon that supports a larger concentric rigid tube which projects outwardly beyond the outlet pipe. The dispensing hose has a rigid pipe connected thereto which is adapted to be received by the rigid tube and into abutting contact with the outlet pipe. An inflatable annular tube is secured to the rigid tube and encompasses the outlet pipe and the rigid pipe upon reception of the rigid pipe by the rigid tube so that upon inflation of the inflatable annular tube the coupling interconnects and seals the outlet pipe, the rigid tube and the rigid pipe.

4 Claims, 2 Drawing Sheets

QUICK DISCONNECT COUPLING

BACKGROUND OF THE INVENTION

This invention relates to a quick disconnect dispensing coupling for use with a conduit for dispensing ingredients to a reactor tank or vessel.

In the chemical processing industry large reactor tanks are used in the polymerization process where ingredients for the process are first measured and then separately stored in hoppers or charge tanks for subsequent dispensing into the large tanks. In the dispensing process it is important to add the ingredients in a timely manner and quickly in order to properly and accurately follow the recipe. It is extremely important in this dispensing process that the ingredients be moved promptly and accordingly the present invention provides the means for accurately and promptly connecting the respective hoppers or charge tanks to the dispensing conduit to assure a timely dispensing process. The quick disconnect apparatus of the instant invention provides a reliable yet accurate means for interconnecting the dispensing hose and the respective charge tanks to the main reactor tank assuring a timely dispensing of the ingredients.

SUMMARY OF THE INVENTION

A quick disconnect coupling wherein one end of such coupling is an outlet pipe that is connected to a charge tank which stores ingredients. The other end of the coupling is a rigid pipe connected to one end of a hose for transferring the ingredients of the charge tank to a reactor tank. The outlet pipe has a concentrically mounted rigid tube secured thereto via an annular flange which cooperates to receive the rigid pipe. An inflatable tube or mandrel is located between the rigid pipe and the rigid tube which is connected to the outlet pipe such that on inflation of the inflatable tube the rigid pipe is securely fastened to the outlet pipe and its concentrically mounted rigid tube to assure a sealing connection for transfer of materials from the charge tank to the reactor tank.

BRIEF DESCRIPTION OF THE INVENTION

DETAILED DESCRIPTION OF THE INVENTION

Figure 1:
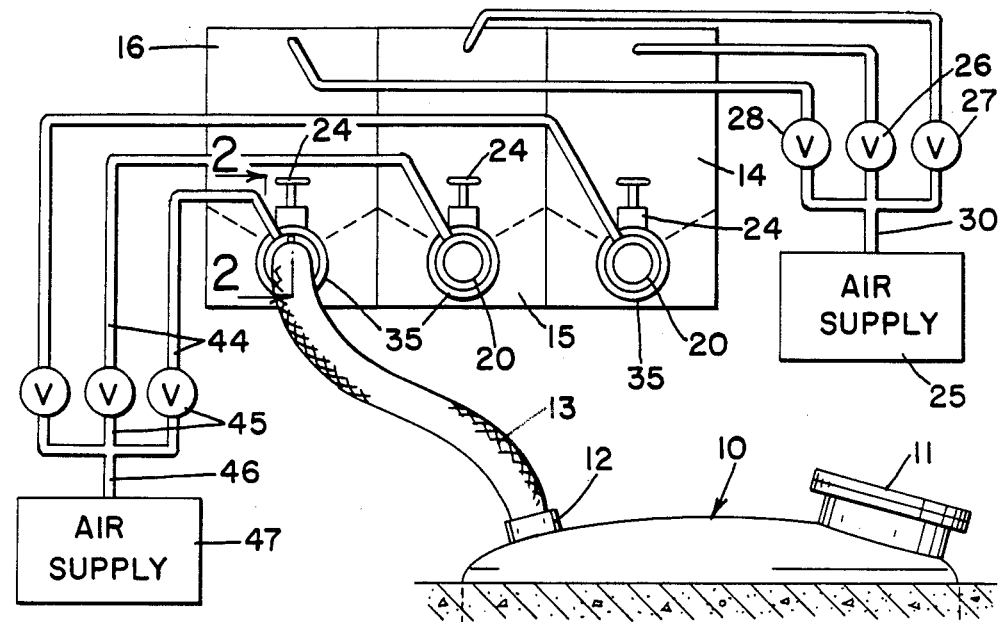
FIG. 1 is a schematic showing of a plurality of charge tanks which store ingredients for dispensing to a reactor tank via a dispensing hose.

Referring to the drawings wherein like reference numerals designate like or corresponding parts throughout the several views, there is shown in FIG. 1 a reactor tank or vessel 10 having a circular flange 11 and an inlet or hose coupling 12.

Reactor tank 10 is used in the chemical processing industry for the polymerization of polyvinyl chloride and it is necessary to introduce the polymerization ingredients thereinto via a supply or dispensing hose 13, which hose 13 has one end connected to such inlet coupling 12. The ingredients which can be in slurry form or in an aqueous solutions, are measured and then stored in hoppers or charge tanks designated 14, 15 and 16 prior to dispensing into the tank 10. The numbers of hoppers or charge tanks shown in only illustrative and the quick disconnect coupling can be used with other types of dispensers or hoppers. Such ingredients include monomers, catalysts, surfactants, and shortstops. Each of the charge tanks has an outlet conduit or pipe 20 suitably controlled for dispensing ingredients therethrough via a gate valve 24 located closely adjacent the end portion thereof.

To facilitate the pumping action where necessary from such charge tanks 14, 15 and 16, an air supply tank 25 is connected by suitable control valves 26, 27 and 28 via a supply conduit 30 to such tanks. All of the respective outlet pipes 20 are similar in construction and only one will be described.

Figure 3:
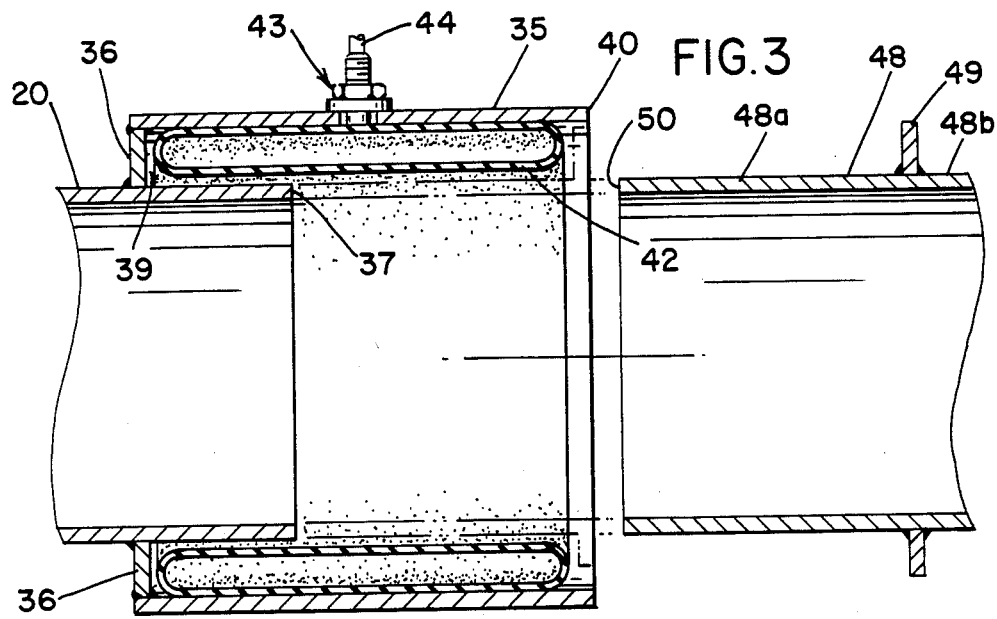
FIG. 3 is an enlarged side elevational view in cross section of the quick disconnect coupling with the respective interconnecting members in spaced relationship.

The outermost end of outlet pipe 20 has a circumferentially extending cylindrical rigid tube 35 connected via an annular flange 36 thereto. The inner diameter of the cylindrical tube 35 is substantially greater than the outer diameter of the outlet conduit or outlet pipe 20 to define a chamber 39 therebetween. The outermost end of cylindrical tube 35 defines an annular edge 40 that is axially spaced from the outermost end 37 of outlet pipe 20 (FIG. 3). The axial length of the pipe 20 between the annular flange 36 and edge 40 is approximately one-third ($\frac{1}{3}$) of the total axial length of rigid tube 35.

An annular flexible inflatable tube or mandrel 42 has its outer circumferential surface suitably bonded or cemented to the inner circumferentially extending surface of cylindrical tube 35. The interior of inflatable tube 42 is connected by a suitable inlet connector 43 to a conduit 44 which in turn is connected to a control valve 45 which in turn is connected to a conduit 46 and an air supply reservoir 47.

As previously stated the one end of dispensing hose 13 is connected to an inlet or hose coupling 12 of reactor tank 10 while the other end of dispensing hose 13 is connected to a rigid pipe or conduit 48. Conduit 48 has an annular collar 49 suitably attached to the exterior circumference of its mid portion thereby dividing the conduit 48 into a forwardly disposed portion 48a and a rearwardly disposed potion 48b. Annular collar 49 is slightly smaller in its outer diameter over annular flange 36 to facilitate the centering of the pipe 48 into tube 35 and its abutting engagement with outlet conduit or pipe 20.

The outermost circumferential edge 50 of rigid pipe 48 is adapted to abuttingly contact the edge 37 of outlet pipe 20 and acts as a stop upon insertion of pipe 48 into cylindrical tube 35 and inflatable tube or mandrel 42. The inflatable tube or mandrel 42 is then pressurized by control valve 45 which inflates tube 42 which in turn firmly grasps or locks onto the forwardly disposed portion 48a of rigid pipe 48. Control valve 45 is then turned to lock the coupled pipes so that upon opening of gate valve 24, the slurry or aqueous solution in the charge tank can flow or be pumped into the reactor tank 10. A hook 51 on the rearwardly disposed portion 48b of rigid pipe 48 permits the manipulation of the dispensing hose as it is positioned on the respective outlet conduits 20 of charge tanks 14, 15 and 16.

Figure 2:
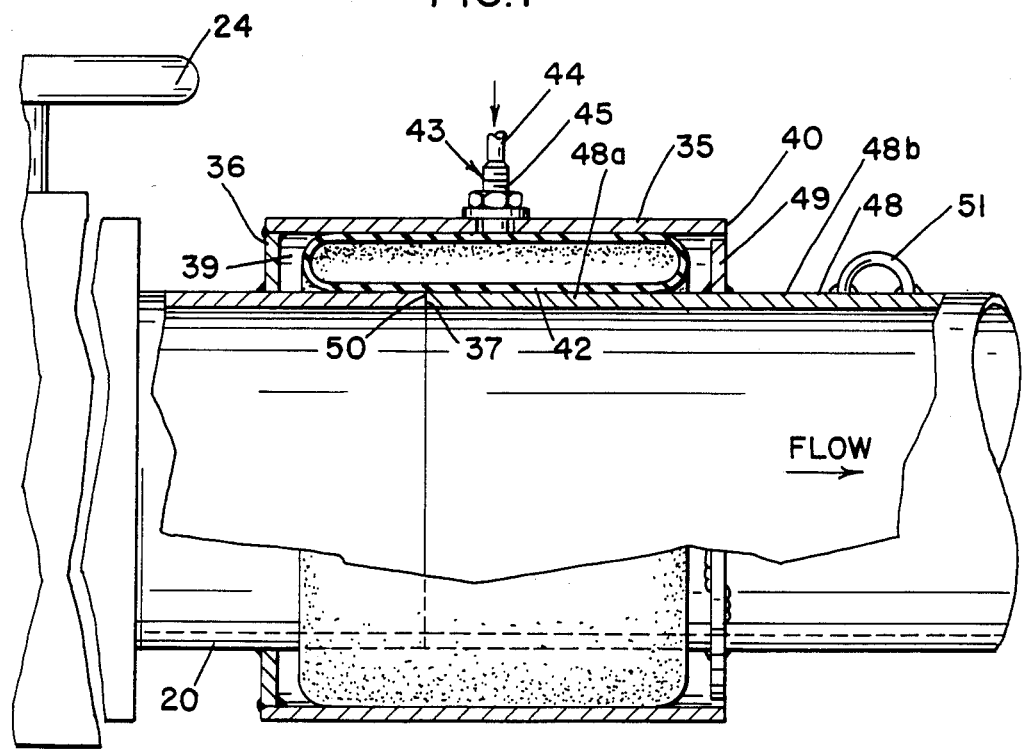
FIG. 2 is an enlarged side elevational view taken on line 2—2 of FIG. 1 of a quick disconnect coupling partly in cross-section for interconnecting the charge tanks with a dispensing hose.
Figure 4:
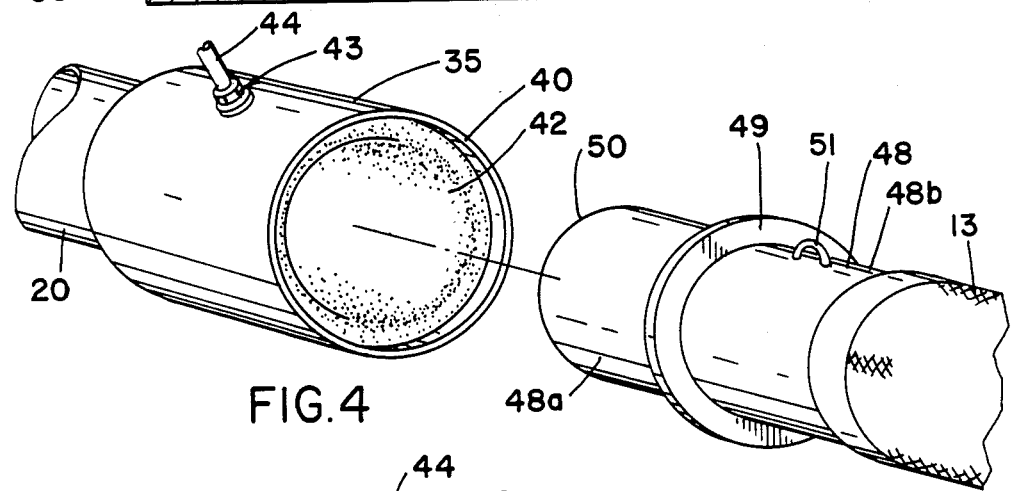
FIG. 4 is an isometric view of the quick disconnect coupling in disengaged condition.
Figure 5:
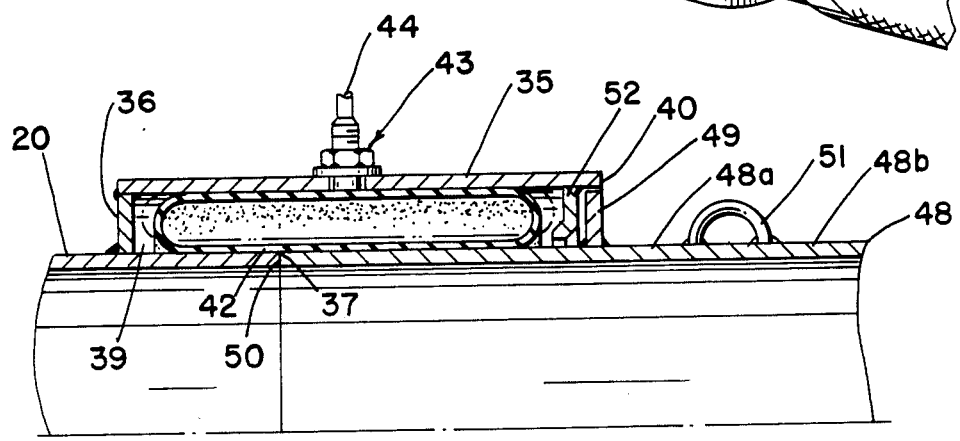
FIG. 5 is a partial side elevational view in cross-section of a modified form of the quick disconnect coupling.

A modification of the invention is disclosed in FIG. 4, which modification is substantially similar to that described in FIGS. 2 and 3 and that the similar elements will be given the same numerals. The pipe or outlet conduit 20 has a flange 36 and an outer circumferential rigid tube 35. The annular inflatable tube 42 is similarly positioned and operates in the same manner as the first described embodiment. The outermost end of tube 35 has a second annular flange 52 positioned and located at the extreme end of the inflatable tube 42. Flange 52 operates in cooperation with the flange 36 to retain the tube 42 centered on the inner circumferential surface of the tube 35 to prevent pinching thereof by the forwardly disposed portion 48a of rigid pipe 48 as it is introduced into tube 35 and abutting engagement with outlet pipe 20.

It will be apparent that although a specific embodiment and a modification thereof has been described in detail, the invention is not limited to the specifically illustrated and described constructions since variations may be made without departing from the principles of the invention.

We claim:

1. A quick disconnect coupling for use in the transfer of ingredients under pressure between an outlet pipe and a flexible dispensing hose, said outlet pipe having a cylindrical end portion with an annular edge at the end thereof, an annular flange secured to the exterior of said end portion spaced rearwardly from said annular edge, a longitudinally extending cylindrical rigid tube having one end secured to said annular flange and having the other end projecting axially a substantial distance beyond said annular edge, said cylindrical rigid tube having an inner circumferentially extending surface, one end of said inner circumferentially extending surface cooperates with said end portion of said outlet tube and said annular flange to define an annular chamber open at one end, a flat circumferentially and axially extending inflatable tube secured to said inner circumferentially extending surface and having a portion thereof located with said annular chamber, said flat inflatable tube extends for less than the full distance of said inner circumferentially extending surface, a rigid cylindrical pipe connected to one end of said dispensing hose, said cylindrical pipe having an exterior diameter equal to the diameter of said outlet pipe, inflation means connected to said inflatable tube that is operative upon inflation to secure said outlet pipe to said rigid cylindrical pipe in sealing engagement, and said rigid cylindrical pipe has a flange secured onto the outer surface thereof to facilitate centering of said rigid cylindrical pipe into said cylindrical rigid tube and to define a closed annular chamber therewith.

2. A quick disconnect coupling as set forth in claim 1 wherein the axial length of said end portion of said outlet pipe from said annular flange to said annular edge is of a first predetermined length, and the axial length of said rigid pipe being of a second predetermined length that is greater than said first length.

3. A quick disconnect coupling as set forth in claim 2 wherein said second predetermined length is greater than twice said first predetermined length.

4. A quick disconnect sealing system for use in connecting outlet pipes of charge tanks to a flexible dispensing hose, each of said outlet pipes having a circular end portion with an annular edge at the end thereof, an annular flange secured to the exterior of each one of said end portions of said outlet pipes defining an axial length of said end portion of a first predetermined length that extends between said flange and said annular edge, each of said outlet pipes having an exterior diameter defining a first diameter, a cylindrical tube having one end secured to each one of said annular flanges, the axial length of each of said tubes being greater than said first predetermined length, each of said cylindrical tubes having an interior surface, a flat circumferentially and axially extending inflatable tube secured to each of said interior surfaces, one end of said dispensing hose having a rigid cylindrical pipe secured thereto, the diameter of said rigid cylindrical pipe being the same as said first diameter, the axial length of said rigid pipe being greater than said first length, said rigid pipe having a flange secured thereto for cooperation with said outlet pipes and their respective cylindrical tubes to define a closed chamber to confine said inflatable tube therein, and inflation means connected to each of said inflatable tubes, and said inflation means having valve means operative upon actuation to selectively inflate one of said inflatable tubes to secure said outlet pipe to said rigid cylindrical pipe upon abutting said rigid cylindrical pipe to one of said annular edges while confining said inflatable tube in the defined closed chamber.

* * * * *